(12) United States Patent
Mardikar (10) Patent No.: US 11,127,045 B2
(45) Date of Patent: Sep. 21, 2021

(54) CONSUMER IDENTITY AND SECURITY AT POINTS OF SALE

(71) Applicant: American Express Travel Related Services Company, Inc., New York, NY (US)

(72) Inventor: Upendra Mardikar, San Jose, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 280 days.

(21) Appl. No.: 15/606,294

(22) Filed: May 26, 2017

(65) Prior Publication Data

US 2018/0341988 A1 Nov. 29, 2018

(51) Int. Cl.
G06Q 30/02 (2012.01)
G06F 16/335 (2019.01)
G06F 16/9535 (2019.01)
H04W 4/80 (2018.01)

(52) U.S. Cl.
CPC ....... *G06Q 30/0269* (2013.01); *G06F 16/337* (2019.01); *G06F 16/9535* (2019.01); *G06Q 30/0255* (2013.01); *H04W 4/80* (2018.02)

(58) Field of Classification Search
USPC ...................................................... 705/14.66
See application file for complete search history.

(56) References Cited

U.S. PATENT DOCUMENTS

| | | | | |
|---|---|---|---|---|
| 7,689,506 | B2* | 3/2010 | Fei | G06Q 20/10 705/39 |
| 8,775,238 | B2* | 7/2014 | Angell | G06Q 30/02 705/14.53 |
| 9,727,859 | B1* | 8/2017 | Toewe | G06Q 20/3674 |
| 10,565,589 | B2* | 2/2020 | Pitz | G09G 5/377 |
| 2002/0138351 | A1* | 9/2002 | Houvener | G06Q 10/10 705/18 |
| 2011/0047040 | A1* | 2/2011 | Carlson | G06Q 20/10 705/26.1 |
| 2011/0047072 | A1* | 2/2011 | Ciurea | G06Q 20/10 705/39 |
| 2011/0202466 | A1* | 8/2011 | Carter | G06Q 20/3224 705/67 |

(Continued)

OTHER PUBLICATIONS

Combining Propensity and Influence Models for Product Adoption Predicton; Ilya Verenich, Riivo Kikas, Marlon Dumas, Dmitri Melniko (Year: 2015).*

*Primary Examiner* — Victoria E Frunzi
(74) *Attorney, Agent, or Firm* — Thomas Horstemeyer, LLP (57) ABSTRACT

An identity and security system may register a user associated with a mobile device and a user identity that comprises characteristics of the user. The system may assign a reputation score and a spend propensity score to the user identity. The system may base the reputation score on a plurality of reputation assessments, and the spend propensity score on a history of transactions and non-transactions by the user. The system may also detect the mobile device at a merchant location, and it may transmit at least one of the reputation score and the spend propensity score to a POS device at the merchant location in response to detecting the mobile device at the merchant location.

19 Claims, 4 Drawing Sheets

(56) References Cited

U.S. PATENT DOCUMENTS

| | | | |
|---|---|---|---|
| 2013/0268332 A1* | 10/2013 | Chyu | G06Q 30/06 705/14.17 |
| 2014/0012701 A1* | 1/2014 | Wall | G06Q 20/3224 705/26.8 |
| 2015/0025989 A1* | 1/2015 | Dunstan | G06Q 20/20 705/18 |

* cited by examiner

CONSUMER IDENTITY AND SECURITY AT POINTS OF SALE

FIELD

The present disclosure relates to customer identity, scoring and security available at merchant points of sale.

BACKGROUND

The rise of card-based transactions has spurred an increase of fraud. Having the ability for card-based transactions enables deceptive individuals to fraudulently use transaction cards belonging to others. Felonious individuals may steal cards or pick up lost cards and attempt to use them. Unscrupulous individuals can also compromise magnetic stripe readers to capture transaction account information and subsequently print cards with duplicate magnetic stripes. Even without printing duplicate cards, the account information may be used to complete fraudulent transactions. Vendors may struggle to detect fraudulent card-based transaction as the vendor has little information to verify the customer's identity beyond what is printed on the card.

Merchants face more than just a fraud risk in their attempts to win customers. They also have to consider the value they offer to a customer to distinguish themselves over the competition. Customers seek out more than just a product at a good price. They increasingly want a satisfying experience. Vendors have to consider issues like branding, packaging, personal service, and other ways of setting their goods and services apart in the eyes of their customers. Personal service presents difficulties for merchants that do not know the customer based on a past history of working together. Merchants typically have no idea as to the customer's reputation and propensity for purchasing on a given visit, for example. Furthermore, busy vendors may struggle to prioritize customers and, as a result, valuable customers can walk away unsatisfied. As such, a system is needed that provides more information about customers, customers' reputations and customers' spend.

SUMMARY

A system, method, and computer readable medium (collectively, the "system") is disclosed for publishing to points of sale customer data that relates to the customer's identity, the customer's scoring, and related security. The system may register a user associated with a mobile device and a user identity that comprises characteristics of the user. The system may assign a reputation score and a spend propensity score to the user identity. The system may base the reputation score on a plurality of reputation assessments, and the spend propensity score on a history of transactions and non-transactions by the user. The system may also detect the mobile device at a merchant location, and it may transmit at least one of the reputation score and the spend propensity score to a POS device at the merchant location in response to detecting the mobile device at the merchant location.

In various embodiments, the system may transmit identity data to the POS device comprising at least one of a name of the user, an image of the user, or a preference of the user. The reputation score may be normalized based on the plurality of reputation assessments to a numeric scale. The system may further generate the spend propensity score based on at least one of an average spend amount, a transaction frequency, or a visit frequency. An identity server may store the user identity in a database by writing a record identifiable by a key field. The identity server may also associate the spend propensity score with the user identity by writing a second record comprising the spend propensity score. The second record may thus be selectable using the key field of the user identity. The system may also detect updates for POS devices based at least in part on a make, model, and version number of the POS device. The system may further poll POS devices for a reputation assessment of the user associated with the mobile device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, transaction account holder, card member or the like may include any person, entity, business, government organization, business, software, hardware, machine associated with a transaction account that buys, rents, leases or otherwise acquires merchant offerings offered by one or more merchants using the account and/or who is legally designated for performing transactions on the account, regardless of whether a physical card is associated with the account. For example, the card member may include a transaction account owner, a transaction account user, an account affiliate, a child account user, a subsidiary account user, a beneficiary of an account, a custodian of an account, and/or any other person or entity affiliated or associated with a transaction account.

In general, the various systems disclosed herein provide merchants with actionable information relating to a customer interacting with the merchant. A mobile device associated with the customer may be detected at a merchant location to trigger the delivery of identity data and scores associated with the customer to the merchant. Identity data may include a name, date of birth, age, gender, photograph, preference, passphrase, pin, or other data useable by the merchant to identify, authenticate, and/or interact with the customer. The systems may also deliver to the merchant scores for the customer in various categories. For example, customers may be scored on spend propensity and reputation. Merchants may interact with customers taking into consideration the identity data and scores to enhance the customer experience and reduce fraud.

Tailored security solutions may further reduce fraud and secure the point-of-sale devices. A virtual lounge experience may also be delivered to the customer through merchant portals to further tailor the user experience. Security capabilities may include, for example, security intelligence, identity services, crypto services, native application security services, vulnerability management service, and/or incident response services.

Figure 1:
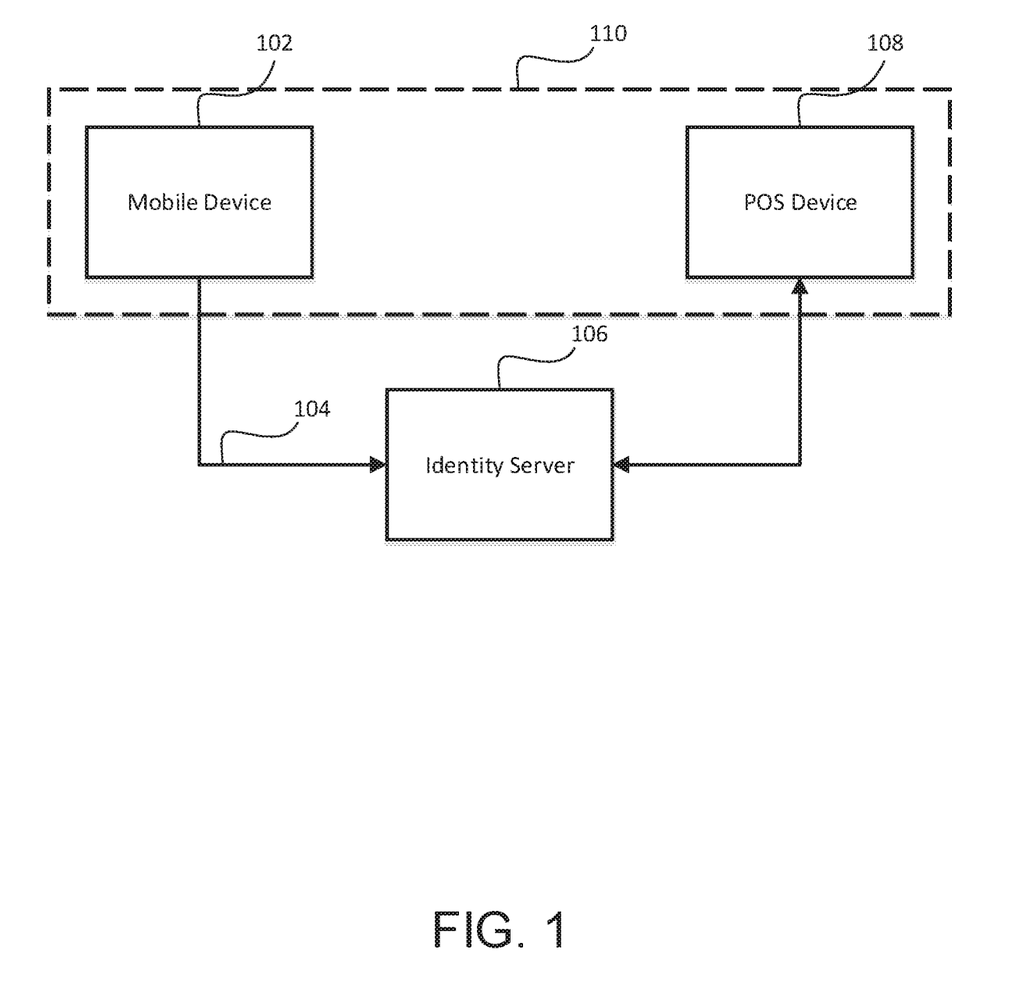
FIG. 1 illustrates an exemplary system for publishing identity data associated with a customer at a point of sale in response to detecting the customer at a merchant location, in accordance with various embodiments.

More specifically, and with reference to FIG. 1, system 100 is configured for security and identity services at points of sale, in accordance with various embodiments. System 100 may comprise a mobile device 102 capable of running a web application or a native application to communicate with one or more identity server 106 and/or one or more POS devices 108 at merchant locations 110. Mobile device 102 may thus comprise any device capable of receiving and displaying an electronic message via network 104. For example, mobile device 102 may take the form of a computer or processor, or a set of computers/processors, including one or more laptops, notebooks, hand held computers, personal digital assistants, cellular phones, smartphones iPhone®, BlackBerry®, Android®, etc.) tablets, wearables (e.g., smart watches and smart glasses), internet-of-things (IoT) devices, or other device capable of sending and receiving data over network 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available such as, for example, Twofish, RSA, El Gamal, Schorr signature, DSA, PGP, PKI, GPG (GnuPG), or other symmetric or asymmetric cryptosystems.

In various embodiments, an application running on mobile device 102 may interact with identity server 106 to register the user of the mobile device 102 with identity servers 106. Prior to allowing registration, identity servers 106 may authenticate a user using various authentication techniques such as, for example, biometrics, passwords, one-time passwords, or security questions, identity server 106 may then allow a user to enable identity services.

The application operating on mobile device 102 may be a native application or web application operating in concert with identity servers 106. A user may use the application to register with the identity servers 106 identity data (e.g., nicknames, preferences, images of the user, and security questions) or other data suitable for association with the user's identity. Identity servers 106 may generate spend propensity scores, reputation scores, and/or other scores for a user by evaluating historic data associated with the user.

A spend propensity score may be a normalized score assigned to a user to allow ease of evaluation of the likelihood of a purchase and/or size of a purchase by the user on the present visit to merchant location 110. A merchant may tailor their behavior towards the customer at least in part based on spend propensity score. The spend propensity score may reflect consumer spending patterns and habits.

For example, a financial institution offering identity and security services through identity server 106 may maintain a history of transactions that occurred at various merchant locations such as merchant location 110. The history may be built from transaction authorization requests or other closed-loop data. Identity server 106 may also maintain a history of user visits to various merchant locations. Identity server 106 may compare the history of transactions and associated transaction details with the history of user visits to merchant locations to derive a spend propensity score for the user. Each time mobile device 102 is detected at a merchant location, a new record may be written to a database table for comparison with the history of transactions at merchant locations. The spend propensity score may be calculated, for example, as an average spend per visit to the merchant location. The spend propensity score may be based on past spends at a selected merchant, past spends at a subset of all merchants, or past spends at all merchants.

A reputation score may be a normalized score assigned to a user to allow ease of evaluation of the user's reputation. Merchants may evaluate users during or after a transaction to influence the user's reputation score. For example, the reputation score may be calculated as an average of reviews received from merchants with or without statistical outliers removed from the set of reviews. The reputation score may be based on merchant reviews of a user at the merchant location, at a subset of all merchant locations, or at all merchant locations. The reputation score and/or spend propensity score may be normalized as scores ranging from 0-5, 1-10, or any other numeric range for ease of adoption by merchants.

Identity server 106 may also communicate over network 104 with point-of-sale (POS) device 108 located at merchant location 110. Identity server 106 may transmit to a POS device 108 identity data associated with a user in response to detecting the user at merchant location 110. POS device 108 may thus give insight to the merchant operating POS device 108 regarding customers present in the store in real-time.

An application operating on mobile device 102 may enable detection of mobile device 102 at a merchant location to trigger transmission of identity data and/or security data from identity server 106 to POS device 108. In various embodiments, mobile device 102 may operate a geo-fencing application integrating with the onboard GPS systems to detect when mobile device enters, exits, or remains within predefined boundaries of a merchant location. In various embodiments, mobile device 102 may operate as a beacon and transmit a signal detectable by a POS device 108 having integrated beacon technology. In various embodiments, the POS device may operate as a beacon and transmit a signal indicative of the merchant location detectable by the application running on mobile device 102. Mobile device 102 may notify POS device 108 and/or identity servers 106 of its presence at the merchant location.

In various embodiments, POS device 108 may have security features installed and/or available from identity server 106 to protect identity data and reduce fraud. Identity server 106 may determine the make, model, and version information for POS device 108. For example, identity server may poll and/or POS device 108 may send to identity server version numbers, serial numbers, a device identifier, or other suitable information to determine the characteristics of the POS device. Identity server 106 may personalize security of POS device 108 by informing the merchant and/or patching POS device 108 in response to known vulnerabilities based on the make, model, and version information. Identity server may do so by reading a library of security programs available for POS device 108 and/or pushing the security programs to POS device 108 in the form of patches, updates, and installations. The updates, patches, and installations may be provided to POS device 108 on a subscription basis, for example. Software protection including external threat intelligence, malware detection, and/or crypto management may also be offered as a service for and/or installed on POS devices on the basis of make, model, and version information. For example, a POS device may be a tablet having version number corresponding to the installed version of an operating system. The operating system version may be used to identify compatible software protection suitable for installation.

Figure 2:
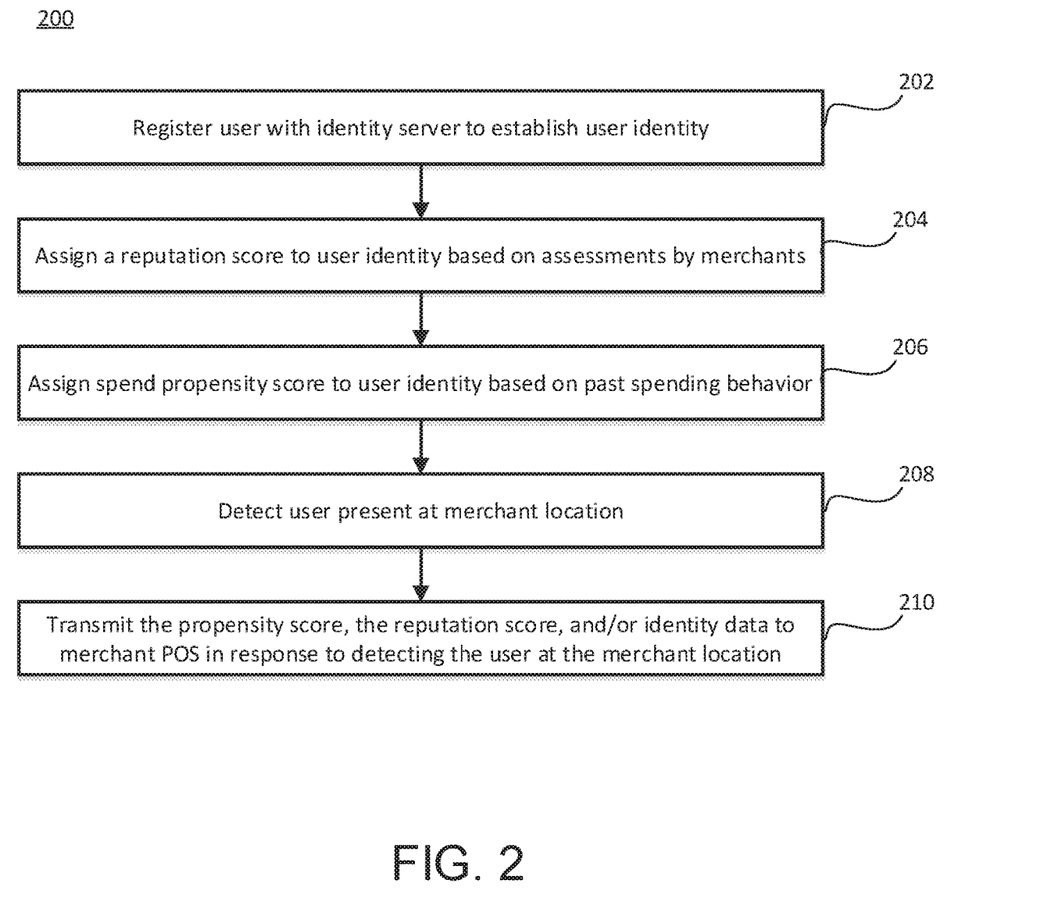
FIG. 2 illustrates a process for publishing identity data and scores to point-of-sale devices, in accordance with various embodiments.

Referring now to FIG. 2, process 200 is shown for delivering identity data and scores to POS devices. Using mobile device 102, a user may register with identity server 106 to establish a user identity (Block 202). The user identity may be associated with a transaction account held by the user and maintained with a financial institution, for example. The user identity may include various identity-related data such as explicit attributes, physical attributes, implicit attributes, identity linkages, offline and online shopping behavioral analytics.

In various embodiments, explicit attributes may include data explicitly provided by the user to identity server 106 such as, for example, name, address, or date of birth. These attributes may be provided from the user to identity server 106 using a web interface, for example, or by a third party service that compiles and serves the user data through an API interface. Physical attributes may include attributes of the user such as, for example, biometrics, heartbeat, gait, known clothing, or vocal characteristics. These characteristics may be inherent in the user and measured by exposure to the user. Implicit attributes may include characteristics related to the user such as, for example, devices used, device IDs, geo-locations, geo-fencing, IP addresses, phone numbers, or email addresses.

In various embodiments, identity data may be augmented by leveraging third-party data, data analytics, and merchant polling. Identity server 106 may use identity linkages to strengthen identity data through third-party online resources. For example, identity linkages may include the user's authentication or login information for online access to social media accounts, banking accounts, investment accounts, technological accounts, shopping accounts, vendor accounts, or other user accounts accessible with third-party providers.

In various embodiments, identity server 106 may assign a reputation score to the user identity based on assessments by the merchants (Block 204). Identity server 106 may poll merchants for opinions or receive opinions from merchants evaluating a customer on one or more measurable features. The opinions may be collected to provide human observable insight into the customer's reputation. For example, merchants may opine as to a customer's pleasantness, honesty, attention needs, general reputation, or the merchant's desire to work with the customer again. The reputation opinions may be associated with the user's identity and/or augmented and evaluated to generate one or more reputation scores. The reputation score may be a numeric evaluation of a customer as perceived by a merchant. The scores may be correlated to letter-based grades or text, for example, using a lookup table or set of numbers that match the grade or description.

In various embodiments, identity server 106 may assign a spend propensity score to the user identity based on past spending behavior (Block 206). Identity server 106 may analyze offline and online shopping behavior to generate insights associated with the user's identity. The insights may be reflected in the spend propensity score. The spending propensity may also include text-based insights describing the shopping habits, preferences, preferred merchants, merchant preferred segments, or other characteristics derivable from the user's purchase history. For example, the frequency of spend and/or amount of spend over a selected time period may be used to lookup a spend propensity score on a lookup table. The spend propensity score may also be calculated by plugging spend amount and/or frequency into a numeric function. The result may be scaled to a scoring range such as, for example, 1-10.

In various embodiments, at least one of identity server 106, POS device 108, and/or mobile device 102 may detect a user present at merchant location 110 (Block 208). The user may be detected at merchant location 110 on the basis of mobile device 102 being present at the merchant location and associated with the user's identity. Mobile device 102 may be associated with the user's identity by having the user log into an account on mobile device 102 and with identity server 106. Mobile device 102 may also be associated with the user's identity in response to the user using mobile device 102 to interact with identity server 106 in the past, or by device characteristics such as, for example, IP address, device fingerprint, or device ID.

In various embodiments, identity server 106 may transmit a spend propensity score, a reputation score, and/or identity data to POS device 108 in response to detecting the user at the merchant location (Block 210). Identity server 106 may send the identity data and scores across network 104 to POS device 108 by way of a native application or web application running on identity server 106. POS device 108 may display the data to an operator to enhance the user experience and reduce fraud. Stores may have multiple POS devices, so the user data may be transmitted to one or more of the POS devices 108. POS devices 108 may present a list of present consumers along with an image for selection. Merchants may, for example, select the user from the list to display their information on the POS device.

Figure 3:
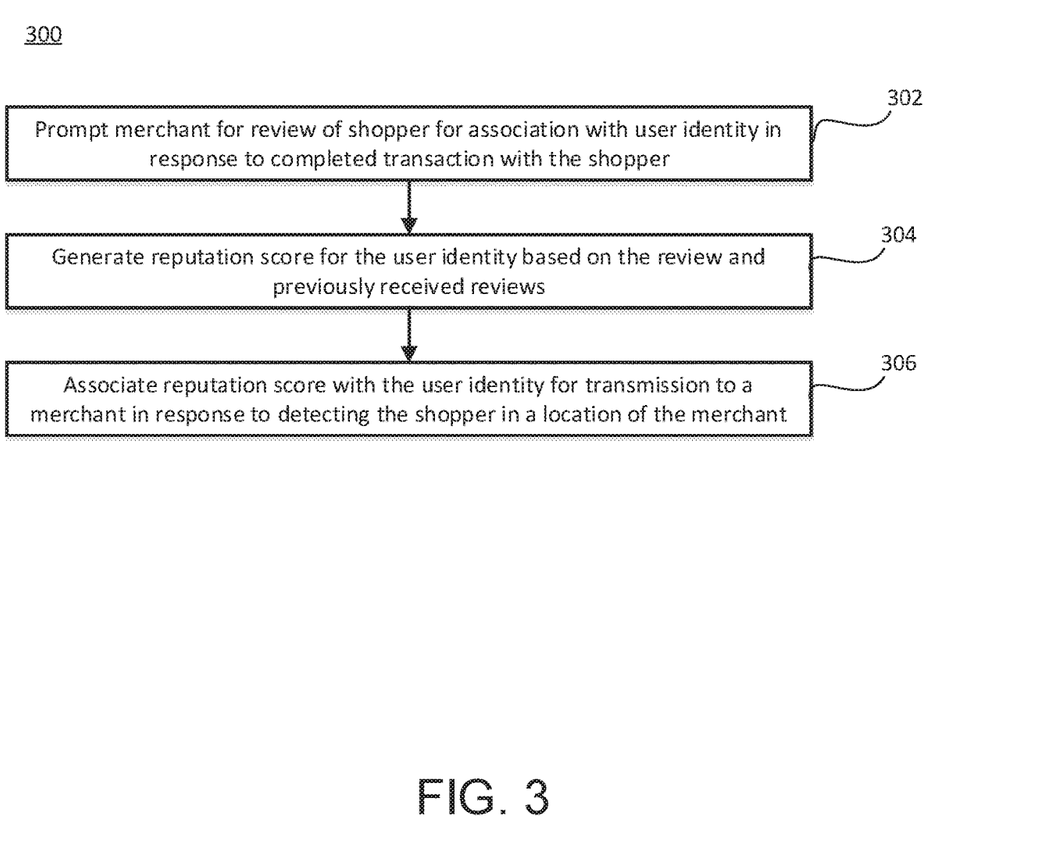
FIG. 3 illustrates a process for generating a reputation score for association with a user identity, in accordance with various embodiments.

Referring now to FIG. 3, a process 300 for applying data analytics to historic data to generate insights into a user's identity, in accordance with various embodiments. POS device 108 may prompt a merchant operator for review or opinion of the user for association with the user's identity in response to completed transaction with the user (Block 302). The prompt may request input on a numeric scale (e.g., 1-10) evaluating one or more characteristics of the user. The prompt may also ask the merchant multiple-choice type questions, true/false type questions, or other questions types with answers suitable to generating a reputation score and/or reputation-based insights.

In various embodiments, identity server 106 may generate reputation score for the user identity based on the review and previously received reviews (Block 304). Insight server may consider reviews in identifiable groupings of interest to merchants. Groupings of reviews for score generation may include, for example, reviews from a selected merchant, reviews from a subset of all merchants, or reviews from all merchants. The historic reviews may be normalized and/or combined into one or more reputation scores for later transmission to POS devices 108. For example, reviews submitted by clothing merchants may be augmented and converted into scores. Numeric reviews, for example, may be averaged to generate a reputation score for the user identity when transacting with clothing merchants.

In various embodiments, identity server 106 may associate the reputation score with the user identity for transmission to POS device 108 in response to detecting the user in merchant location 110 (Block 306). The reputation score may thus be stored in a database or big data storage system for retrieval in association with the user identity. The reputation score may be updated in response to identity server 106 receiving a new or updated review from a merchant. The reputation score may also be calculated in real-time based on the past reviews.

Figure 4:
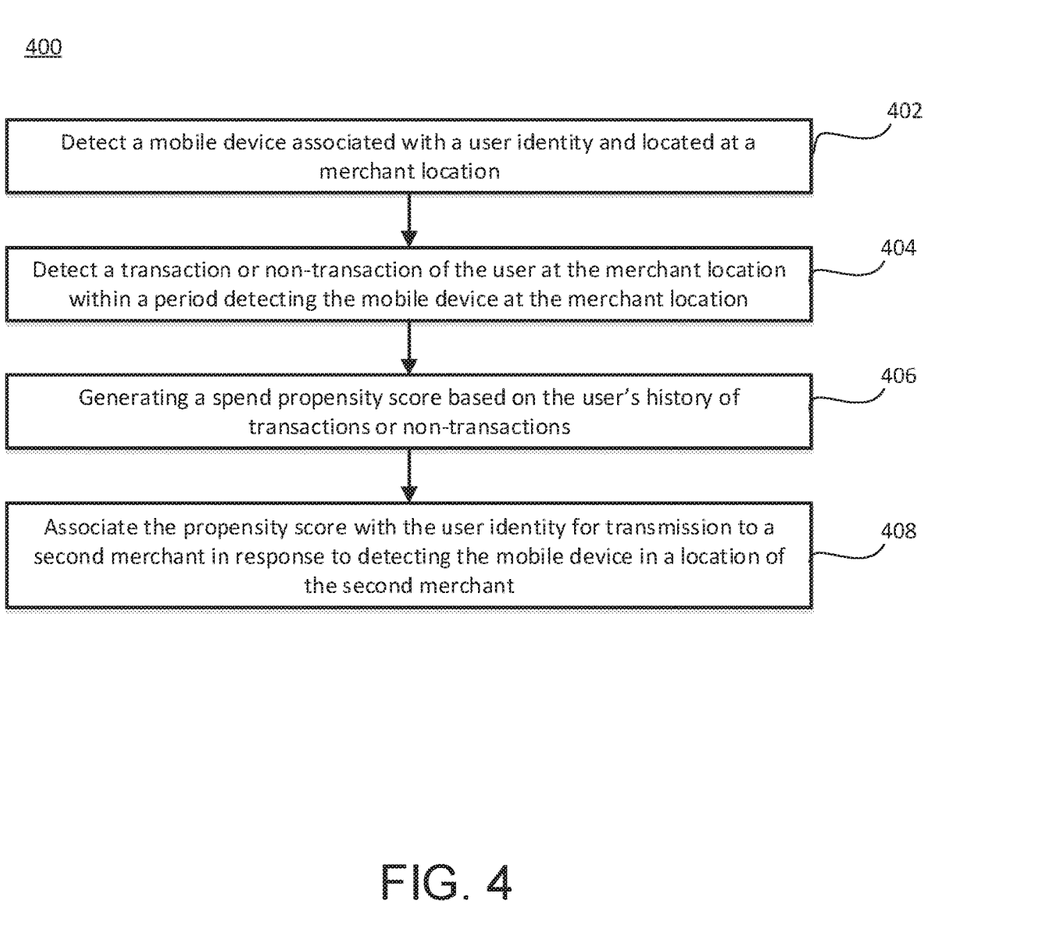
FIG. 4 illustrates a process for generating a spend propensity score for association with a user identity, in accordance with various embodiments.

Referring now to FIG. 4, process 400 is shown for generating a spend propensity score associated with a user identity, in accordance with various embodiments. Identity server 106, POS device 108 and/or mobile device 102 may detect mobile device 102 associated with the user identity and located at merchant location 110 (Block 402). Identity server 106 and/or POS device 108, acting alone or in concert, may detect a transaction or non-transaction of the user at the merchant location within a period of detecting the mobile device at the merchant location (Block 404). Identity server 106 may calculate a spend propensity score from at least one of the spend amount, spend frequency, visit frequency, and/or visit results. The inputs may be used in a lookup table and/or plugged in to a mathematical function to arrive at a spend propensity score. Identity server may correlate the user's presence at merchant location 110 with purchases made to determine the frequency and spend amount at which the user completes transactions relative to in-store visits.

In various embodiments, identity server 106 may generate a spend propensity score based on the user's history of transactions or non-transactions (Block 406). Identity server 106 may associate the spend propensity score with the user identity for transmission to a POS device 108 at a second merchant location 110 in response to detecting the mobile device 102 in second merchant location 110 (Block 408). The spend propensity score may be associated with the user identity for example by writing a record into a database accessible by a key field present in the database and associated with the user identity. Identity server may thus generate and maintain identity data for a user identity for use by various merchants across various merchant segments. Merchants may use the identity data to enhance fraud protection and/or enhance the customer experience.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link. Wherein the link may be sent via an email, text, post, social network input and/or any other method known in the art.

Systems, methods and computer program products are provided in the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The disclosure and claims do not describe only a particular outcome of collecting and generating identity data, but the disclosure and claims include specific rules for implementing the outcome of collecting and generating identity data and that render information into a specific format that is then used and applied to create the desired results of collecting and generating identity data, as set forth in *McRO, Inc. v. Bandai Namco Games America Inc*. (Fed. Cir. case number 15-1080, Sep. 13, 2016). In other words, the outcome of collecting and generating identity data can be performed by many different types of rules and combinations of rules, and this disclosure includes various embodiments with specific rules. While the absence of complete preemption may not guarantee that a claim is eligible, the disclosure does not sufficiently preempt the field of collecting and generating identity data at all. The disclosure acts to narrow, confine, and otherwise tie down the disclosure so as not to cover the general abstract idea of just collecting and generating identity data. Significantly, other systems and methods exist for collecting and generating identity data, so it would be inappropriate to assert that the claimed invention preempts the field or monopolizes the basic tools of collecting and generating identity data. In other words, the disclosure will not prevent others from collecting and generating identity data, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/resealing obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boat and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and may include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server such as a digital wallet hub. For example, a web client may access the services of an application server through another server and/or hardware component, which may have a direct or indirect connection to an Internet server. For example, a web client may communicate with an application server via a load balancer. In various embodiments, access is through a network or the Internet through a commercially available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL)

and Transport Layer Security (TLS). A web client may implement several application layer protocols including http, https, ftp, and sftp.

In various embodiments, components, modules, and/or applications may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules, which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system, which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database-tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked based on the type of data in the key field. The data corresponding to the key field in each of the linked data tables is preferably the same or of the same type. However, data tables having similar, though not identical, data, in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.192.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The merchant computer and the bank computer may be interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means, which implement the function, specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may refer to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Phrases and terms similar to "transaction account" may include any account that may be used to facilitate a financial transaction. Phrases and terms similar to "financial institution" or "account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    registering, by an identity server, a user associated with a mobile device and a user identity that comprises characteristics of the user;
    assigning, by the identity server, a reputation score to the user identity based at least in part on a reputation assessment received from a merchant at a merchant location, wherein the reputation assessment represents a behavioral review of the user in the merchant location in association with a completed transaction;
    assigning, by the identity server, a spend propensity score to the user identity based at least in part on a history of transactions and non-transactions by the user obtained from a history of visits by the mobile device of the user;
    detecting, by the identity server, the mobile device entering a geo-fence area for the merchant location based at least in part on receiving a signal from a point of sale (POS) device at the merchant location, wherein the signal is indicative of the mobile device entering the geo-fence area for the merchant location, wherein the signal is generated by a geo-fence application integrated with a global positioning system of the mobile device and transmitted from the mobile device to the POS device;
    transmitting, by the identity server, the reputation score and the spend propensity score to the POS device for display at the merchant location in response to receiving the signal from the POS device, wherein the POS device displays one or more customers present at the merchant location and updates to display the reputation score or the spend propensity score of the user identity; and
    prompting, by the identity server, the POS device for a review of the user for association with the user identity in response to a completed transaction with the user.

2. The method of claim 1, further comprising transmitting, by the identity server, identity data to the POS device comprising at least one of a name of the user, an image of the user, or a preference of the user.

3. The method of claim 1, further comprising normalizing, by the identity server, the reputation score to a numeric scale.

4. The method of claim 1, further comprising generating, by the identity server, the spend propensity score based at least in part on at least one of an average spend amount, a transaction frequency, or a visit frequency.

5. The method of claim 1, further comprising associating, by the identity server, the spend propensity score with the user identity by writing a second record comprising the spend propensity score, wherein the second record is selectable using a key field of the user identity.

6. The method of claim 1, further comprising determining, by the identity server, an update for the POS device based at least in part on a make, model, and version number of the POS device.

7. A computer-based system, comprising:
    a processor;
    a memory; and
    machine-readable instructions stored in the memory that, when executed by the processor, cause the computer-based system to at least:
        register a user associated with a mobile device and a user identity that comprises characteristics of the user;
        assign a reputation score to the user identity based at least in part on a reputation assessment received from a merchant location, wherein the reputation assessment represents a behavioral review of the user in the merchant location in association with a completed transaction;
        assign a spend propensity score to the user identity based at least in part on a history of transactions and non-transactions by the user obtained from a history of visits by the mobile device of the user;
        detect the mobile device entering a geo-fence area for the merchant location based at least in part on receiving a signal from a point of sale (POS) device at the merchant location, wherein the signal is indicative of the mobile device entering the geo-fence area for the merchant location, wherein the signal is generated by a geo-fence application of the mobile device and transmitted from the mobile device to the POS device;
        transmit at least one of the reputation score or the spend propensity score to the POS device at the merchant location in response to receiving the signal from the POS device, wherein the POS device displays one or more customers present at the merchant location and updates to display the reputation score or the spend propensity score of the user identity; and
        generate a prompt for display on the POS device for a review of the user for association with the user identity in response to a completed transaction with the user.

8. The computer-based system of claim 7, wherein the machine-readable instructions when executed by the processor, further cause the computer-based system to at least transmit identity data to the POS device comprising at least one of a name of the user, an image of the user, or a preference of the user.

9. The computer-based system of claim 7, wherein the machine-readable instructions, when executed by the processor, further cause the computer-based system to at least normalize the reputation score to a numeric scale.

10. The computer-based system of claim 7, wherein the machine-readable instructions, when executed by the processor, further cause the computer-based system to at least generate the spend propensity score based at least in part on at least one of an average spend amount, a transaction frequency, or a visit frequency.

11. The computer-based system of claim 7, wherein the machine-readable instructions, when executed by the processor, further cause the computer-based system to at least store the user identity in a database by writing a record identifiable by a key field.

12. The computer-based system of claim 11, wherein the machine-readable instructions, when executed by the processor, further cause the computer-based system to at least associate the spend propensity score with the user identity by writing a second record comprising the spend propensity score, wherein the second record is selectable using the key field of the user identity.

13. The computer-based system of claim 7, wherein the machine-readable instructions, when executed by the processor, further cause the computer-based system to at least determine an update for the POS device based at least in part on a make, model, and version number of the POS device.

14. The computer-based system of claim 7, wherein the machine-readable instructions, when executed by the processor, further cause the computer-based system to at least poll the POS device for the reputation assessment of the user associated with the mobile device.

15. A non-transitory computer readable medium having machine-readable instructions executable by a processor of a computing device, wherein the machine-readable instructions, when executed, cause the computing device to at least:
  register a user associated with a mobile device and a user identity that comprises characteristics of the user;
  assign a reputation score to the user identity based at least in part on reviews received from a merchant location;
  assign a spend propensity score to the user identity based at least in part on a history of transactions and non-transactions by the user obtained from a history of visits by the mobile device of the user;
  detect the mobile device entering a geo-fence area for the merchant location based at least in part on receiving a signal from a point of sale (POS) device at the merchant location, wherein the signal is indicative of the mobile device entering the geo-fence area for the merchant location, wherein the signal is generated by a geo-fence application of the mobile device and transmitted from the mobile device to the POS device;
  transmit at least one of the reputation score or the spend propensity score to the POS device at the merchant location in response to receiving the signal from the POS device, wherein the POS device displays one or more customers present at the merchant location and updates to display the reputation score or the spend propensity score of the user identity; and
  generate a prompt for display on the POS device for a review of the user for association with the user identity in response to a completed transaction with the user.

16. The non-transitory computer readable medium of claim 15, wherein the machine-readable instructions, when executed by the processor, further cause the computing device to at least generate the spend propensity score based at least in part on at least one of an average spend amount, a transaction frequency, or a visit frequency.

17. The non-transitory computer readable medium of claim 15, wherein the machine-readable instructions, when executed by the processor, further cause the computing device to at least associate the spend propensity score with the user identity by writing a record in a database comprising the spend propensity score and the record is selectable using a key field of the user identity, wherein the user identity is identifiable in the database by the key field.

18. The non-transitory computer readable medium of claim 15, wherein the machine-readable instructions, when executed by the processor, further cause the computing device to at least:
  detect a transaction of the user at the merchant location within a predefined period of time from the detection of the mobile device at the merchant location; and
  update the spend propensity score based at least in part on the transaction.

19. The non-transitory computer readable medium of claim 15, wherein the reputation score comprises a plurality of merchant reviews for the user identity based at least in part on a plurality of previous transactions.

* * * * *